(12) United States Patent
Jones et al.

(10) Patent No.: US 10,426,107 B2
(45) Date of Patent: Oct. 1, 2019

(54) GROW BAG SYSTEM WITH IRRIGATION

(75) Inventors: Lee C. Jones, Okeechobee, FL (US); David Carson, Stuart, FL (US)

(73) Assignee: Jardin Holdings I, LLC, Sarasota, FL (US)

( * ) Notice: Subject to any disclaimer, the term of this patent is extended or adjusted under 35 U.S.C. 154(b) by 1158 days.

(21) Appl. No.: 13/160,902

(22) Filed: Jun. 15, 2011

(65) Prior Publication Data

US 2011/0308153 A1     Dec. 22, 2011

Related U.S. Application Data

(60) Provisional application No. 61/355,886, filed on Jun. 17, 2010.

(51) Int. Cl.
*A01G 27/00*     (2006.01)
*A01G 24/50*     (2018.01)

(52) U.S. Cl.
CPC ............ *A01G 27/005* (2013.01); *A01G 24/50* (2018.02)

(58) Field of Classification Search
USPC ..... 47/59 R, 64, 60, 62 R, 62 A, 62 C, 62 E, 47/63, 65.5, 65.7, 65.8, 84, 48.5, 7, 9, 79
See application file for complete search history.

(56) References Cited

U.S. PATENT DOCUMENTS

| | | | |
|---|---|---|---|
| 3,362,106 A * | 1/1968 | Goldring | 47/56 |
| 3,613,309 A | 10/1971 | Coburn | |
| 4,027,427 A | 6/1977 | Stoller et al. | |
| 4,076,147 A | 2/1978 | Schmit | |
| 4,291,499 A * | 9/1981 | Prewer | A01G 31/02 47/17 |
| 4,299,056 A | 11/1981 | Towning | |
| 4,679,705 A | 7/1987 | Hamilton | |
| 5,137,524 A * | 8/1992 | Lynn et al. | 604/533 |
| 5,193,306 A | 3/1993 | Whisenant | |
| 5,201,141 A * | 4/1993 | Ahm | 47/67 |
| 5,241,783 A | 9/1993 | Krueger | |
| 5,309,673 A | 5/1994 | Stover et al. | |
| 5,544,447 A | 8/1996 | Easey et al. | |
| 5,799,440 A | 9/1998 | Ishikawa et al. | |

(Continued)

FOREIGN PATENT DOCUMENTS

GB     2267205     * 12/1993
JP     2000-69854     * 3/2000

(Continued)

*Primary Examiner* — Thanh Pham
(74) *Attorney, Agent, or Firm* — McHale & Slavin, P.A.

(57) ABSTRACT

The instant invention describes a grow bag with a dosing irrigation tube inserted within the inner cavity of the grow bag for controllable dispersant of plant nutrients therein. The system comprises a top panel and a bottom panel secured to a plurality of side walls to form an inner cavity. Attached to the top panel is a dosing irrigation tube or pipe constructed and arranged to traverse the length of the bag and have a first and second end that is external to the inner cavity. Housed within the inner cavity of the bag is plant growth material for providing support and nutrients for the growth of one or more plant species. The invention also describes a system of two or more grow bags with a dosing irrigation tube coupled together and arranged in a variety of conjurations, including horizontally or vertically in a linear fashion or non-linear fashion.

16 Claims, 19 Drawing Sheets

(56) References Cited

U.S. PATENT DOCUMENTS

| | | | |
|---|---|---|---|
| 5,839,659 A * | 11/1998 | Murray | 239/1 |
| 6,108,970 A * | 8/2000 | Ball | 47/48.5 |
| 6,367,191 B1 | 4/2002 | Inoue et al. | |
| 6,389,750 B1 * | 5/2002 | Wilde | 47/79 |
| 6,412,218 B2 | 7/2002 | Lee | |
| 6,415,548 B1 * | 7/2002 | Mumme | 47/65.8 |
| 7,407,340 B2 * | 8/2008 | Byles | 405/45 |
| 7,682,103 B2 | 3/2010 | Byles | |
| 2002/0017055 A1 * | 2/2002 | Nalbandian et al. | 47/48.5 |
| 2002/0134462 A1 | 9/2002 | Hall | |
| 2004/0134438 A1 * | 7/2004 | Ticktin | 119/65 |
| 2005/0166451 A1 * | 8/2005 | Stachnik | A01G 9/022 47/65.7 |
| 2007/0267414 A1 * | 11/2007 | Ewerszumrode | 220/366.1 |
| 2008/0155892 A1 * | 7/2008 | Katzir-Shimoni et al. | 47/39 |
| 2008/0282609 A1 * | 11/2008 | Nelson | 47/48.5 |
| 2009/0300984 A1 * | 12/2009 | Gordon | 47/66.7 |
| 2011/0094154 A1 * | 4/2011 | Joaquin | 47/65.8 |

FOREIGN PATENT DOCUMENTS

| | | |
|---|---|---|
| WO | WO8600494 A1 | 1/1986 |
| WO | WO2009007414 A1 | 1/2009 |
| WO | WO2011049786 A2 | 4/2011 |

* cited by examiner

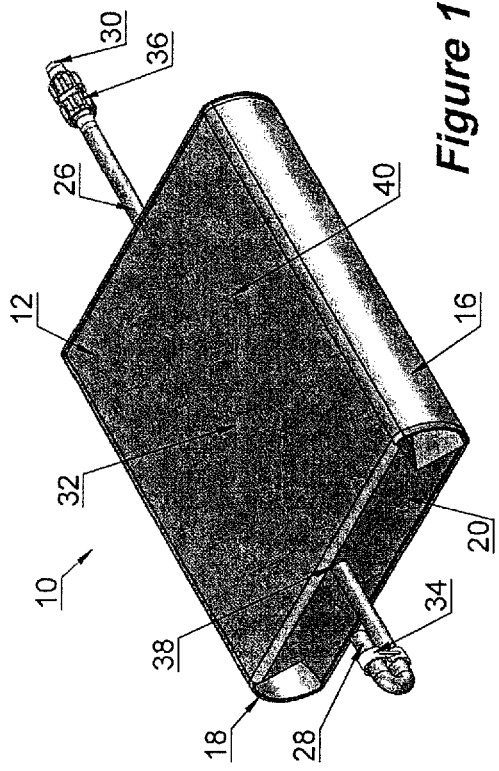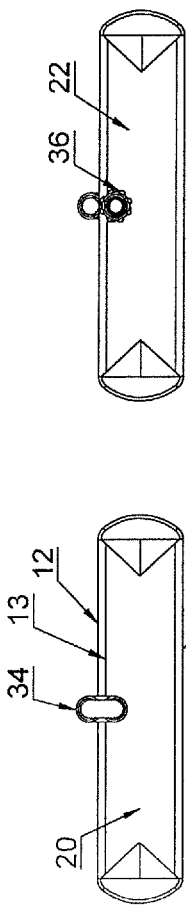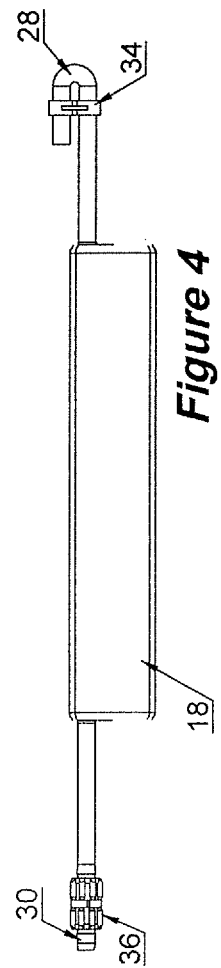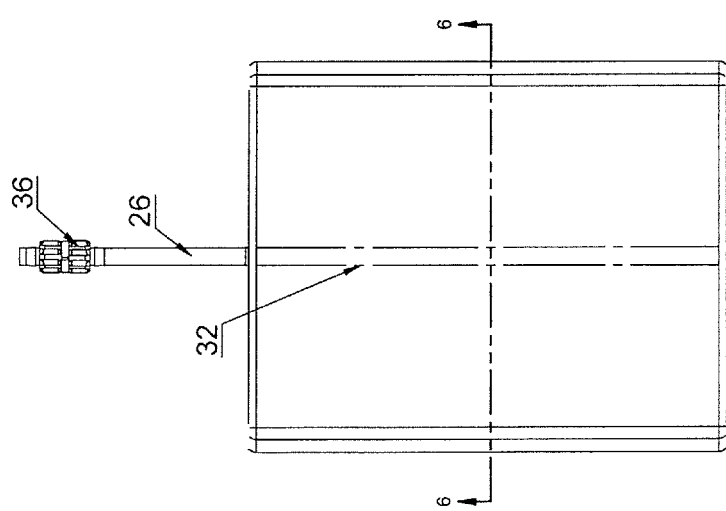

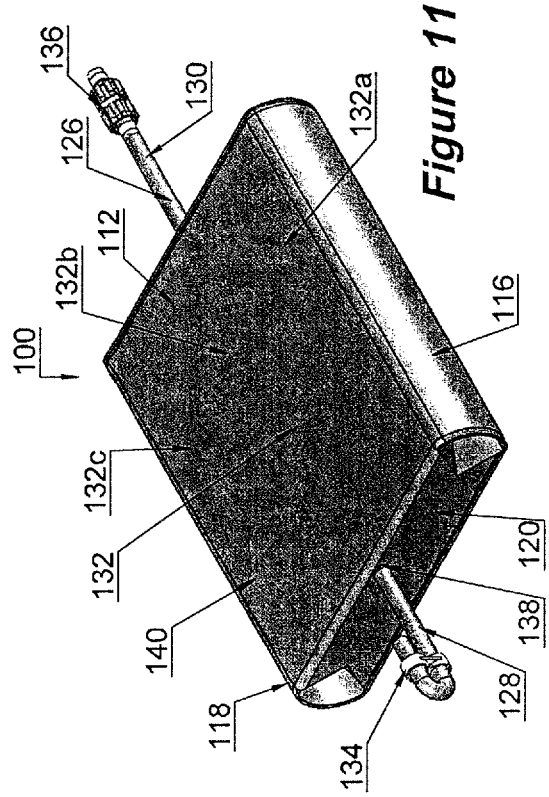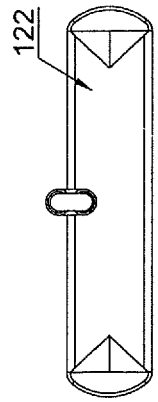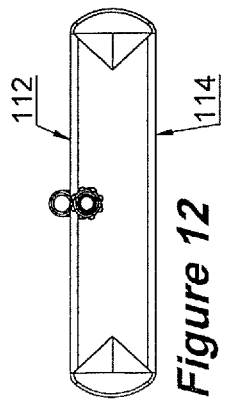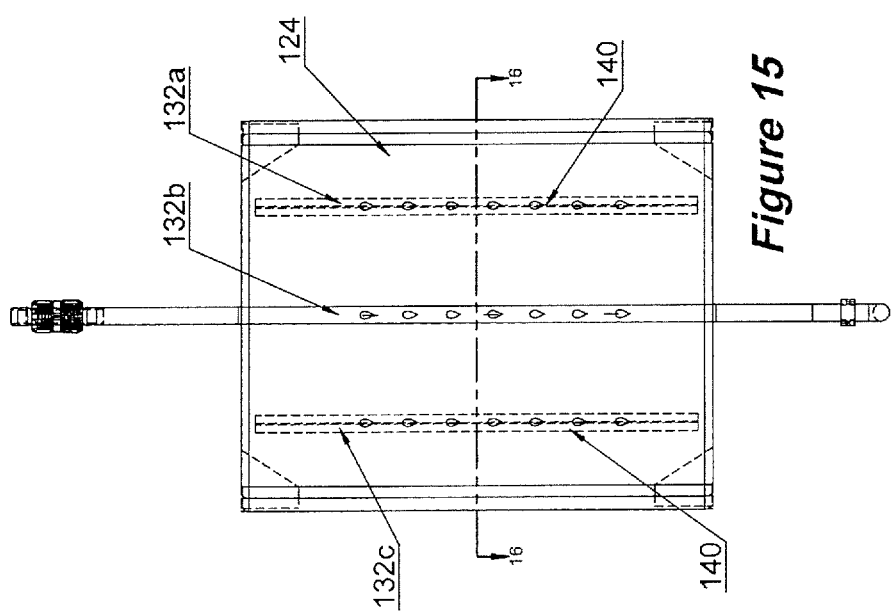

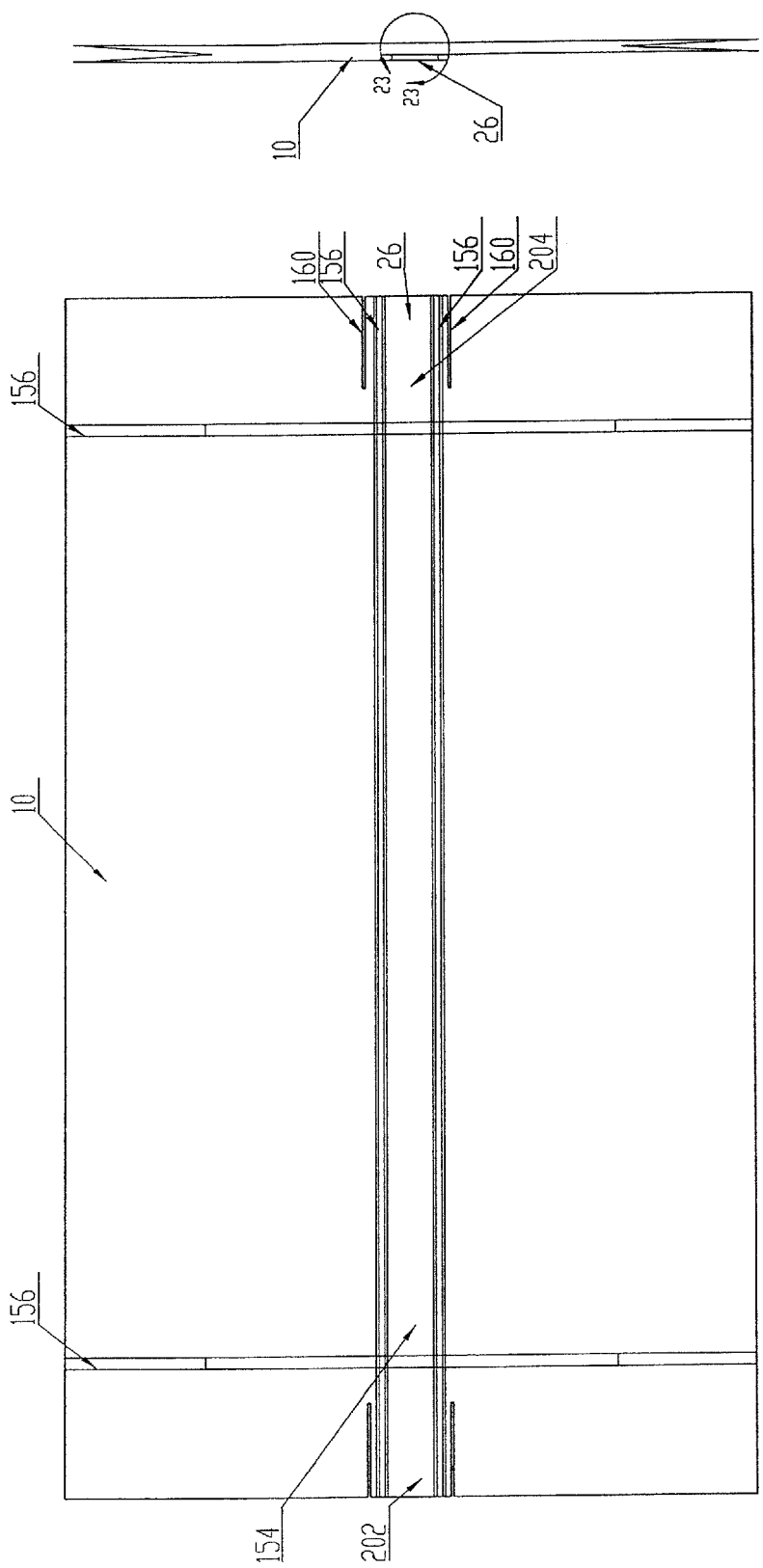

GROW BAG SYSTEM WITH IRRIGATION

RELATED APPLICATIONS

This application claims priority under 35 U.S.C. 119(e) to the U.S. Provisional Application No. 61/355,886, entitled "Grow Bag with Dosing Irrigation Tube" filed Jun. 17, 2010, the contents of which are incorporated herein by reference.

FIELD OF THE INVENTION

The invention relates to a self-contained plant grow bag; and more particularly, to a self-contained plant grow bag, or system of interconnected plant grow bags, with a dosing irrigation tube for actively dispersing water to specific areas within the self-contained plant grow bag.

BACKGROUND OF THE INVENTION

There are three basic gardening systems in use by today's gardeners. The first systems are basic variations of in-ground gardening. An example is the "raised bed garden". This system can be costly and the gardener will also face many potential weed/irrigation issues. The second systems available are hydroponic systems. An example of this is the "Hydrostacker." These systems have a very large upfront cost, and special fertilizer must be purchased as the roots will come in direct contact with the fertilizer solution. They are fairly complicated and inexperienced gardeners have a high failure rate. The third systems are containerized gardening systems. An example of this is the "earthbox." These systems are also very costly and soil must be purchased to put in the container. Also, a separate irrigation system must be purchased or it will require daily watering. The new gardening system invented by the instant inventor, overcomes many of the issues faced by these other systems. Some of its attributes are water conservation, weed control, ease of use, built in irrigation system, soil mixtures designed for specific crops, and the ability to grow various crops under one irrigation system as different bag mixes are hooked to one irrigation supply. With this system, today's novice urban gardener will be successful.

While traditional means of gardening generally require larger plots, new methods of gardening are taking root and are increasing in popularity. Small gardening systems, which utilize pre-packaged dirt and container systems, are becoming very popular for the weekend gardener or for those who lack large amounts of plantable space. A disadvantage to using these systems is that because the plants are not planted within the ground, the user must purchase large amounts of pre-packaged dirt. The pre-packaged dirt is generally sold in large container bags which are difficult to carry and may include more dirt than is actually required. Smaller bags of pre-packaged dirt are available; however, these sizes are generally more expensive than their larger counterparts. Moreover, for the average gardener, it is often difficult to determine the exact amount of dirt required, resulting in the purchase of too much dirt or too little dirt. Time and energy is wasted in returning the unused bags to the nursery, or having to stop in the middle of planting to purchase additional bags. Because containment gardening does not require in ground planting where plants can find sources of water within soil, another disadvantage of the container system is the continuous need for the gardener to provide water. The watering process is time consuming if done regularly and properly. Additionally, watering requires a fair amount of labor, particularly if using a watering bucket to water a large number of planting containers.

Therefore, what is needed in the art is a system of grow bags that can be connected together to create a garden. The grow bags should include an irrigation system and sufficient time release fertilizer to grow a single planting of vegetation. The bags should be connectable to one another to allow the user to create gardens of various sizes.

DESCRIPTION OF THE PRIOR ART

Various grow type bags have been described in the prior art. For example, U.S. Pat. No. 4,027,427 discloses a method and equipment to implement the method for the production of microbes on a solid or liquid substrate. The equipment is particularly useful for the growth of mushroom mycelium on a grain substrate. This mushroom spawn is grown in a transparent, heat sterilizable plastic bag with a temporary screw-on closure thereon. The finished spawn is prepared for market merely by removing the reusable temporary closure and closing the top of the plastic bag container.

U.S. Pat. No. 4,076,147 discloses an improved container formed of a plastic film pouch having a tubular member in one end of the same and positioned within a paper carton and secured thereto. The pouch is filled through the opening in the tubular member which projects through an aperture in the paper container. The tubular member is held to the surface of the container through a locking member and a sleeve member. A projecting portion of the sleeve member is threaded to receive a cap for sealing the container.

U.S. Pat. No. 4,299,056 discloses a generally horizontally arranged sack-like bag. The sack-like bag is formed of a capillary type wicking sheet material which is filled with a plant growth material such as peat moss or other soil compositions. At least one loose flap, which is part of a lower surface forming portion of the bag, extends downwardly from one edge of the bag. The loose flap is immersed in a liquid, such as water. The liquid continuously flows through capillary action up the flap and along at least the lower surface of the bag, providing continuous dispersion into the filler material for feeding liquid to the roots of plants which are grown through the upper surface of the bag.

U.S. Pat. No. 4,679,705 discloses a fluid supply system having a plastic bag reservoir into which the other parts of the system may be packed. The other parts of the system include a flow pipe, a connector to connect the pipe to a wall of the reservoir and fluid supply outlet drip-valves. The connector may be in two or three parts and may be arranged to puncture a hole in the reservoir wall and grip the wall as the parts of the connector are interengaged. Each drip-valve is adjustable to vary the amount of fluid supplied from the reservoir to a grow-bag.

U.S. Pat. No. 5,193,306 discloses an apparatus and method for conserving water and reducing labor in growing plants. The apparatus includes a reservoir container assembly and an arch support structure. The reservoir container assembly comprises a reservoir container capable of holding water, as well as a bag container disposed on top of the reservoir container for holding a plant growing medium. Water in the reservoir container is connected via a hydroscopic medium to the growing medium inside the bag container. The top surface of the bag container is provided with at least two openings. A plant grows through one opening, and evaporation takes place through a second remote opening. In use, a plurality of such reservoir container assemblies may be disposed in a line in a field and a series of arch support structures disposed between them. The plants which grow out of the bag containers and over the arch support structure are thereby supported off the ground.

U.S. Pat. No. 5,241,783 discloses a growing medium container or bag for growing plants such as nursery stock above ground, and the process for growing plants in the bags and later transplanting the plants. The design of the containers allows for efficient growing and maintaining of the plants above ground while obviating many of the disadvantages of growing plants, even in containers, in the soil. The process for forming the growing medium container is also disclosed.

U.S. Pat. No. 5,309,673 discloses a plant carrier for cultivating plants, seedlings, or seeds. The carrier has at least one layer of plant-growing material, an upper layer of natural fiber, and a lower layer of natural fiber sandwiching the plant growth layer in between. The carrier also includes thread means for stitching and sewing the upper and lower natural fibers layers together, which is supported by a natural fiber layer means combining the upper and lower fiber layers along at least portions of their edges to produce a hose-like cover that is filled with the plant layer of the plant growing material.

U.S. Pat. No. 5,544,447 discloses a root control and containment system for holding and growing a plant in a cavity in the earth for controlling and containing vertical and horizontal root growth. The system includes a vessel having upstanding sidewalls, a base therebelow, and an open top thereabove. A root inhibiting carbon bound material is in chemical communication with the vessel, and stores and releases the root inhibiting carbon bound materials over protracted periods of time. The root inhibiting carbon bound material is disposed in a discrete pattern relationship on an inner surface of the sidewalls and the base. The controlled release of the carbon bound material rejects lateral root growth therethrough the wall and vertical root growth therethrough the base of the vessel. An arctuate collar is attached to an upper edge of the sidewall of the vessel and is disposed above the surface of the earth surrounding the cavity for rapid identification of the cavity by field personnel when performing field tasks. A cradle is adapted for congruent residence inside the vessel and is in removable engagement with the sidewalls and the base of the vessel. The cradle is vertically disposed and has a plurality of rings horizontally disposed in a spaced apart relationship. A plurality of lifting ears are disposed on an upper ring thereof for removing the plant safely when desired.

U.S. Pat. No. 5,799,440 discloses a floating island with a water-purifying effect, including a floating body and an agent container. The floating body includes a planter made of a foamed resin, soil contained in the planter, and plants planted in the soil. A plurality of openings are provided in the bottom of the planter through which water is supplied to the soil in the planter and roots of the plants grow into water. The agent container stores an oxygen-generating agent therein, which is attached on the outside of the bottom of the planter.

U.S. Pat. No. 6,367,191 discloses a method of sawdust-based cultivation of Shiitake mushrooms and a cultivation water tank used for the method. A top portion of a cultivation bag which includes a cultivation bed (sawdust-based substrate) is cut to expose a top surface of the cultivation bed and water is poured into a gap between the bag and bed. A cultivation water tank comprises a framework, water tanks arranged in the framework, sawdust-based substrates arranged in the water tank, a latticed frame, water sprinklers, an air blower and illuminators, a pump connected to the water pipe, and the exhaust pipe. The exhaust pipes are provided at a drain pipe so that water may not overflow onto the top surface of the sawdust-based substrates which is characterized in that water is circulated to refrain mushrooms from fruiting and growing from the side and bottom faces of the sawdust-based substrates, but to grow only from the top surface of sawdust-based substrates.

U.S. Pat. No. 6,412,218 discloses a device, system and method for promoting the growth, development and harvest of desired plants while suppressing the growth of weeds. In an exemplary embodiment, the device is a tapered container with an opening at the upper, wider end of the device and an opening at the lower, narrower end of the device. The device also has one or more openings along the surface of the device between the upper end and the lower end. In an exemplary embodiment of the method, a bag of growing medium is placed over the ground and a device is inserted into the bag so that the lower end penetrates both sides of the bag and enters the ground below. The opening at the lower end communicates with the ground. The opening at the upper end of the device should be at or above the upper surface of the bag, and at least one or more openings on the surface of the device should be in communication with the growing medium contained within the bag. Thus, weed growth is suppressed and a plant grown in the device has access to nutrients contained in the bag and the ground below.

U.S. Pat. No. 6,415,548 discloses a mini-garden bag, adapted to lie on a relatively flat surface. The bag contains a suitable plant mix of nutrients appropriately fertilized and pH-adjusted as desired. The bag is pre-marked to be slit through at intervals on its top surface to admit seeds or seedlings and water, and also on its bottom surface to drain excess water. The absorption/reflectivity of the bag surface can be modified by the grower, as desired, by peeling away and/or by reattaching shiny or dark strips of the bag's exposed surface, to adjust the effect of sunlight on the interior temperature, thereby enabling growers to accentuate or to counter prevailing climate or some changes therein.

United States Patent Application 2002/0134462 discloses a portable levee system. The system includes a bag having a pre-selected geometric shape, such as a trapezoid. The bag is continuous in that it has a length at least equal to its width, and is preferably many times as long. A top portion of the bag is open for receiving nutrient rich dirt. The bag preferably has a soaker hose extending through an end and over a plurality of lateral webs within the bag. The bag may be filled with dirt and crops planted therein. The soaker hose may be attached to a pump and water source to provide water to the crops. A plurality of bags may be linearly aligned in order to form a plurality of rows of crops.

U.S. Pat. No. 7,682,103 discloses an ornamental planting landscape irrigation distribution and reservoir product and method ecosystem employing a substantially continuous panel on the soil surface on which ornamental landscape plantings are placed or produced. The panel has a primary, lateral water distribution structure which distributes water from a water charging inlet through the lateral area to the panel periphery, where it is restrained. The primary water distribution structure is constructed such that when filled with water or completely submerged in water, air is trapped by the gaps and spaces of the material for ornamental landscape plant usage.

SUMMARY OF THE INVENTION

The instant invention describes a grow bag with a dosing irrigation tube integrally built into the bag, or alternatively inserted within the inner cavity of the grow bag, for controllable dispersant of water and/or plant nutrients therein. The grow bag with a dosing irrigation tube comprises a top surface and a bottom surface. The top surface and the bottom surface are secured to a plurality of side walls to form an inner cavity. The grow bag with a dosing irrigation tube may be constructed of materials having certain properties, including permeability, semi-permeability, or non-permeability to particular elements. In at least one embodiment, one surface of the grow bag has irrigation tube formed from a portion of the bag with connection fittings for attachment to other bags, hoses, timing and/or pressure regulating equipment. In an alternative embodiment, the irrigation tube or pipe is attached to an inner surface of the bag and is constructed and arranged to traverse the length of the bag, and have a first and second end that is external to the inner cavity of the grow bag. Attached to the first end could be a hose clip. Attached to the second end could be a hose connector. Housed within the inner cavity of the bag is plant growth material for providing support and nutrients for the growth of one or more plant species. The invention also describes a system of two or more grow bags with dosing irrigation tubes coupled together and arranged in a variety of configurations, including horizontally or vertically in a linear fashion or non-linear fashion. The irrigation tube or pipe may include apertures, drippers, micro-sprinklers, screens, meshes or suitable combinations thereof for transferring the water or fluid from the irrigation tube to the growth media within the bag. In this manner, the user can tailor the irrigation to a particular plant or climate.

Accordingly, it is an objective of the instant invention to teach a grow bag with a dosing irrigation tube.

It is a further objective of the instant invention to teach a grow bag with a dosing irrigation tube which is constructed to contain adequate air space for optimal root growth.

It is yet another objective of the invention to teach a grow bag with a dosing irrigation tube which contains proper soil structure for root redevelopment.

It is a still further objective of the instant invention to teach a grow bag with a dosing irrigation tube which provides for water conservation.

It is a further objective of the instant invention to teach a grow bag with a dosing irrigation tube constructed and arranged to provide controllable release of water and plant nutrients to the inner cavity portion of the grow bag.

It is yet another objective of the instant invention to teach a grow bag with a dosing irrigation tube containing planting material for support and growth of one or more plant species.

It is a further objective of the invention to teach a grow bag with a dosing irrigation tube which can be interconnected to one or more grow bags to form a system of grow bags arranged vertically or horizontally in a linear fashion.

It is a still further objective of the invention to teach a grow bag with a dosing irrigation tube which can be interconnected to one or more grow bags to form a system of grow bags arranged vertically or horizontally in a non-linear fashion.

It is a still further objective of the invention to teach a grow bag having an integrally formed irrigation tube.

It is a still further objective of the invention to teach a grow bag having an irrigation tube integrally formed along the bag seam.

It is a still further objective of the invention to teach a fitting constructed and arranged to cooperate with an irrigation tube formed integrally into a grow bag.

It is a still further objective of the invention to teach a dibber tool that is constructed and arranged to pierce a shaped aperture into a grow bag.

It is a still further objective of the invention to teach a dibber tool that is constructed and arranged to include a seed pocket for placing seeds at a predetermined depth within a grow bag.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 1 is a right side, perspective view of the grow bag with a dosing irrigation tube of the instant invention;

FIG. 2 is a end view of the grow bag with a dosing irrigation tube of the instant invention;

FIG. 3 is a rear end view of the grow bag with a dosing irrigation tube of the instant invention;

FIG. 4 is a side view of the grow bag with a dosing irrigation tube of the instant invention;

FIG. 5 is a top view of the grow bag with a dosing irrigation tube of the instant invention;

FIG. 11 is a right side, perspective view of an alternative embodiment of the grow bag with a dosing irrigation tube of the instant invention;

FIG. 12 is a front end view of the alternative embodiment of the grow bag with a dosing irrigation tube illustrated in FIG. 11;

FIG. 13 is a rear end view of the alternative embodiment of the grow bag with a dosing irrigation tube illustrated in FIG. 11;

FIG. 14 is a left side view of the alternative embodiment of the grow bag with a dosing irrigation tube illustrated in FIG. 11;

FIG. 15 is a top view of the alternative embodiment of the grow bag with a dosing irrigation tube illustrated in FIG. 11;

FIG. 21 is a top view of one embodiment of the grow bag of the instant invention, illustrated in an unfilled condition;

FIG. 22 is an end view of the grow bag illustrated in FIG. 21;

DETAILED DESCRIPTION OF THE INVENTION

Figure 6:
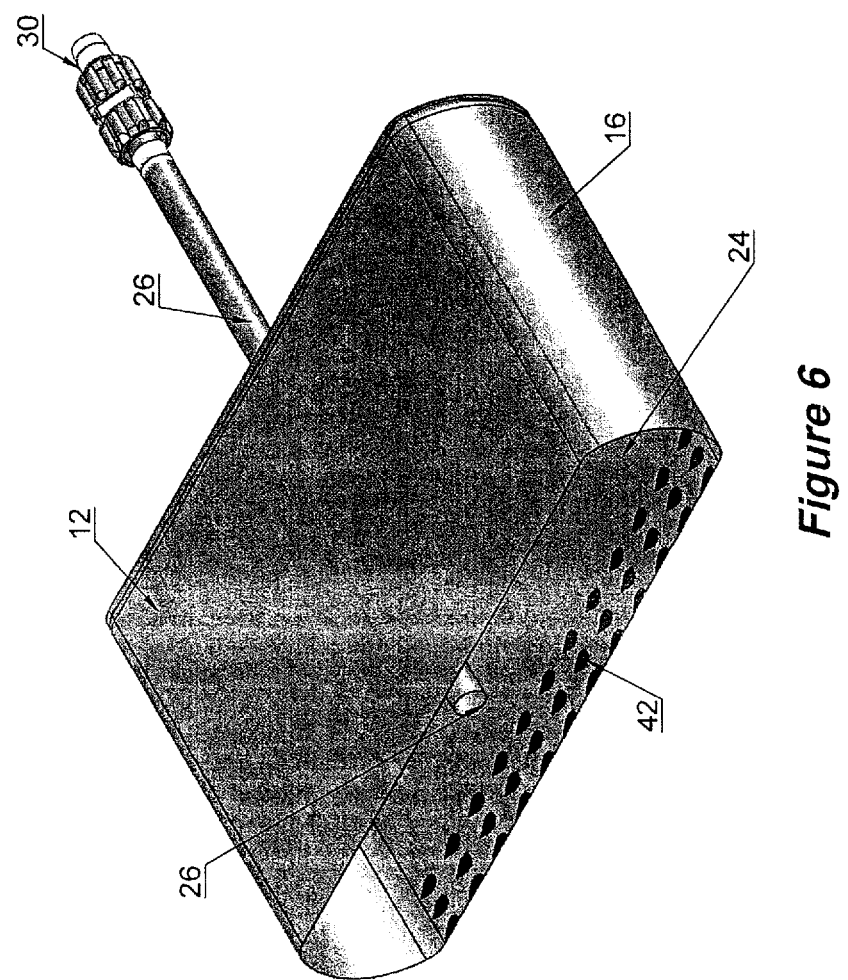
FIG. 6 is a partial perspective cross sectional view taken along lines 6-6 of FIG. 5, illustrating the inner cavity of the grow bag with a dosing irrigation tube of the instant invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 23:
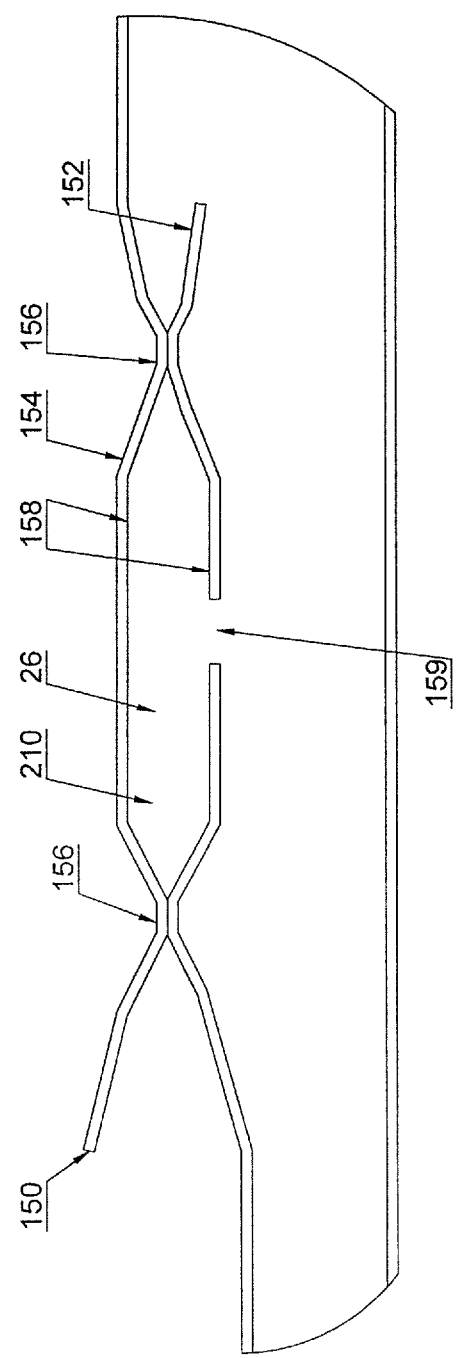
FIG. 23 is a partial view taken along lines 23-23 of FIG. 22, illustrating an integrally formed irrigation tube formed along a seam of the grow bag.

Referring generally to the Figures, a grow bag with irrigation tube is illustrated in which similar reference characters denote similar elements throughout the several views. As illustrated in FIGS. 1-3, one embodiment of the grow bag 10 with an irrigation tube 26 is illustrated. The grow bag 10 is generally constructed to contain a predetermined volume of growing medium (earth or the like) in a predetermined shape to allow plant root growth within the bag while the remaining portions of the plant extend outside of the bag. Thus, the bag must have sufficient depth so as to not cause root bind or result in stunted plant growth. In the preferred embodiment the grow bag is constructed to be parallelepiped in shape to maximize shipping and storage density. However, it should be noted that other three dimensional shapes suitable for encasing sufficient growing medium for plant growth may be utilized without departing from the scope of the invention. Still referring generally to the Figures, the grow bag comprises a top panel 12 and a bottom panel 14. The top panel 12 and the bottom panel 14 are secured to side panels 16 and 18 end panels 20 and 22 to form an inner cavity 24 (see FIGS. 6, 19 and 20). In a most preferred embodiment, all of the panels are formed from a single sheet of polymeric material wrapped around the growth material and sealed along one side and at the ends as is illustrated in FIGS. 21-23. Attached to an inner surface of one of the panels of the grow bag is an irrigation tube or pipe 26. In a most preferred embodiment, the irrigation tube is secured to the inner surface 13 of the top panel 12 (FIG. 2) to take advantage of gravity for distribution of the liquid to the growing medium. The grow bag 10 can be constructed of a variety of materials, including but not limited to flexible materials, plastics such as thermoplastics including polyethylene, polypropylene, and polyvinyl chloride, or the like. Additionally, the bag may be constructed of materials having certain properties, such as having the characteristics of being permeable, semi-permeable or non-permeable to particular elements. For example, the material can be permeable or semi-permeable to oxygen and non-permeable to water. The material could be chosen to have the characteristic of being permeable to water located on the inside of the bag but non-permeable to water originating from the external environment, thereby allowing expulsion of water from the inside while preventing water originating from the external environment from entering into the bag. By providing a closed system, the instant invention enhances water conservation and significantly reduces the possibility of fertilizer run off or hazardous material contamination.

The irrigation tube 26 is generally constructed to traverse the length of the main body of the grow bag and contains a first end 28, a second end 30, and a middle portion 32. Attached to the first end 28 is a hose clip 34. Attached to the second end is a hose connector 36. While the illustrative embodiment describes a clip attached to the first end and a hose connector attached to the second end, the grow bag with a dosing irrigation tube 10 can be designed such that the first end and the second end contain hose connectors or other devices, such as timing devices. The irrigation tube 26 is inserted within the main body of the grow bag with a dosing irrigation tube 10 through an opening 38 of the side wall 20 and an opening positioned on the side wall 22, not illustrated. The middle portion 32 of the irrigation tube 26 is secured to the bottom surface 13 of the top panel 12 through various securing means known to one of skill in the art, including attachment through chemical bonding, heat, friction or stitching. Alternatively, the upper panel 12 could be constructed of a multi-ply layering such that the middle portion 32 can be secured through insertion between the layers. Positioned along the length of the middle portion 32 of the irrigation tube 26 is one or a plurality of variously sized nutrient dispensing apertures, or slits 40. In place of or, in addition to the slit(s), the irrigation tube or pipe may include drippers, micro-sprinklers, screens, meshes or suitable combinations thereof for transferring the water or fluid from the irrigation tube to the growth media within the bag. In this manner, the user can tailor the irrigation to a particular plant or climate.

Figure 24:
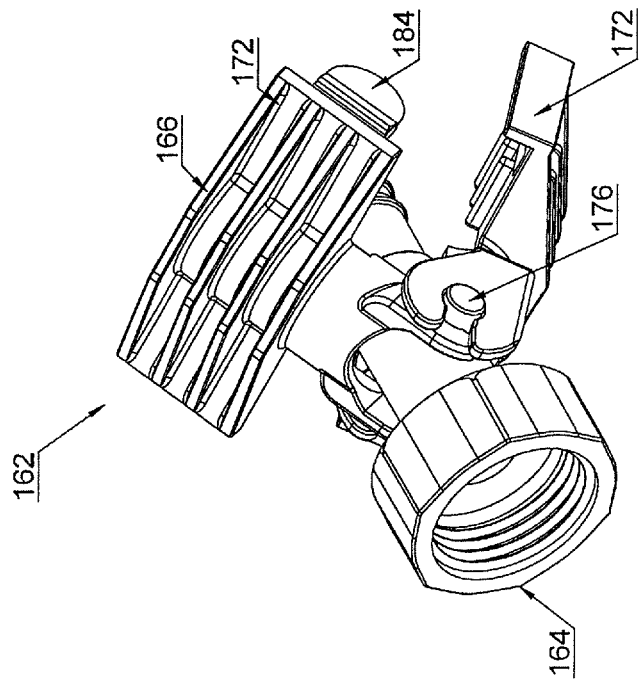
FIG. 24 is a front perspective view of one embodiment of a pinch connection fitting constructed and arranged for attachment to an integrally formed irrigation tube.
Figure 25:
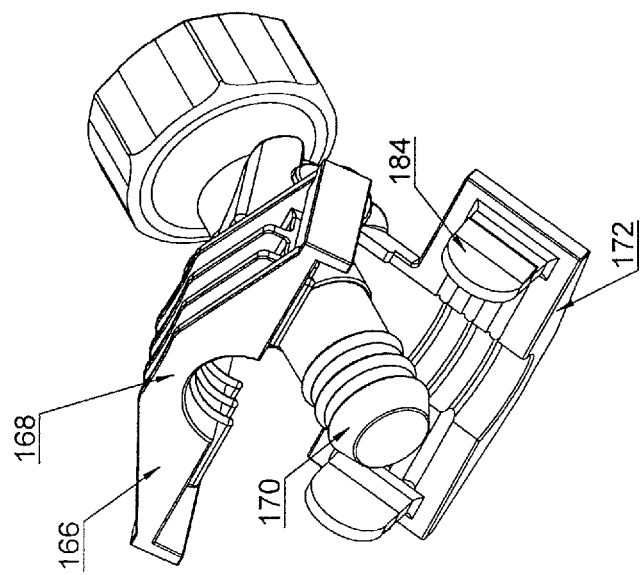
FIG. 25 is a rear perspective view of the pinch fitting illustrated in FIG. 24.
Figure 27:
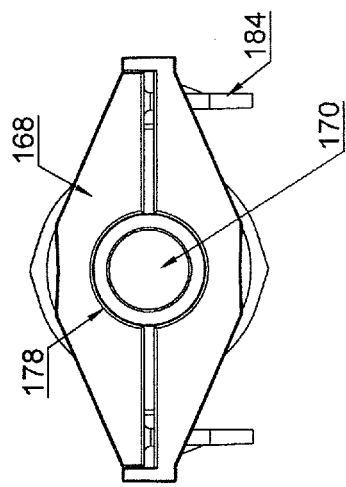
FIG. 27 is a rear view of the pinch fitting illustrated in FIG. 24.
Figure 26:
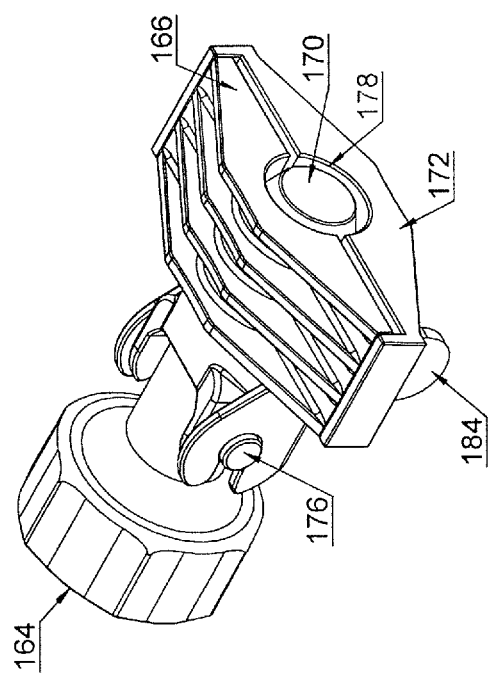
FIG. 26 is a rear perspective view of the pinch fitting illustrated in FIG. 24.

Referring to FIGS. 17-23, an alternative embodiment of the grow bag is illustrated. In this embodiment the panels are formed from a single sheet of polymeric material wrapped around the growth material and sealed along one side and the ends. In one embodiment, the distal sides 150, 152 are overlapped to form a lap joint 154. Two spaced apart weldments 156 extend substantially the length of the top panel 12 to define the irrigation tube 26. The weldments may be formed by any method known in the art for attaching polymeric materials. Such methods may include, but should not be limited to, heat, RF, friction, chemical, adhesive or suitable combinations thereof. In at least one embodiment, a release agent 158 may be applied to the space between the weldments 156 to prevent adhesion of the distal sides in the area where the release agent is applied while still allowing weldment of the top panel 12 to the bottom panel 14 to seal the ends of the grow bag via weldments 156. Weep holes 159 are provided to allow the liquid to be transferred to the growth media. Drippers, micro-sprinklers, screens, meshes or suitable combinations thereof may be utilized in combination with the irrigation tube for transferring the water or fluid from the irrigation tube to the growth media within the bag. In this manner, the user can tailor the irrigation to a particular plant or climate. It should also be noted that the distal sides may be abutted side by side with the irrigation tube extending perpendicularly with respect to the top panel without departing from the scope of the invention. In this embodiment, weep holes (not shown) may be provided through the weldment nearest the top panel to allow water to flow into the growth media. A pair of slits 160 are positioned in close proximity to the weldments 156 to allow clamp fittings 162 (FIG. 24) to be attached to the distal ends 202, 204 of the irrigation tube 26.

Figure 9:
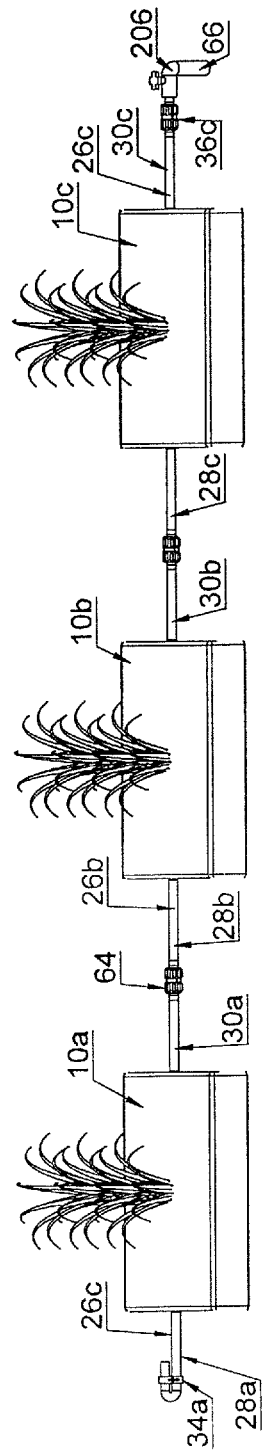
FIG. 9 illustrates a plurality of the grow bags with a dosing irrigation tube of the instant invention interconnected to form a linearly aligned plant landscape.
Figure 10:
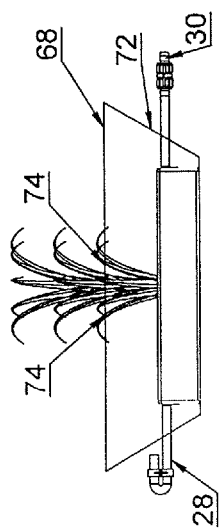
FIG. 10 is a side view of the grow bag with a dosing irrigation tube of the instant invention, illustrating the grow bag positioned within a decorative tray.
Figure 28:
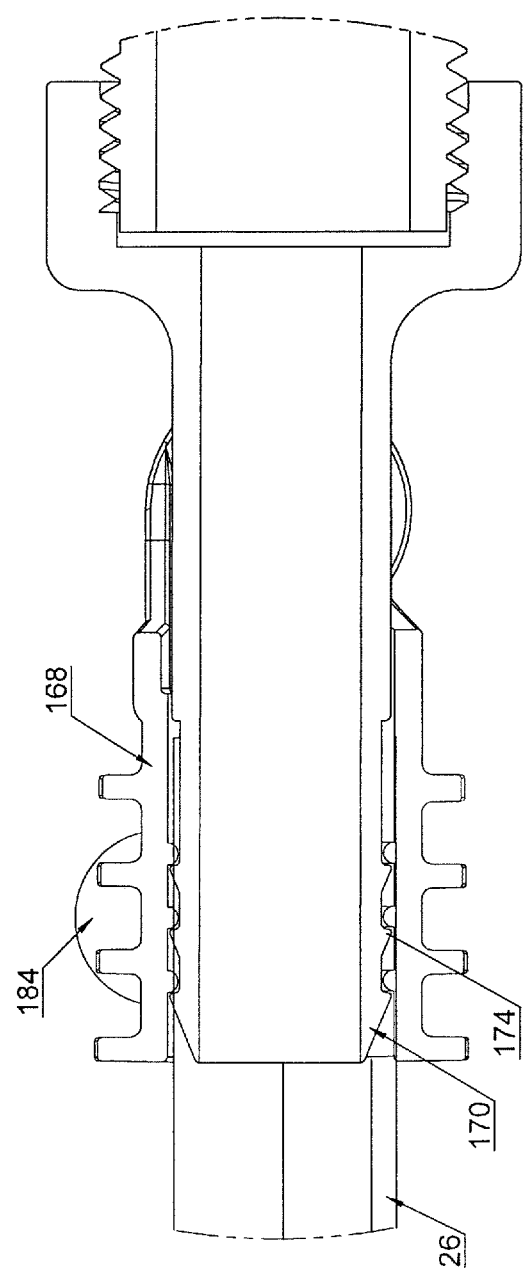
FIG. 28 is a section view taken along lines 28-28 of FIG. 20, illustrating the cooperation between the pinch fitting and the integrally formed irrigation tube.
Figure 30:
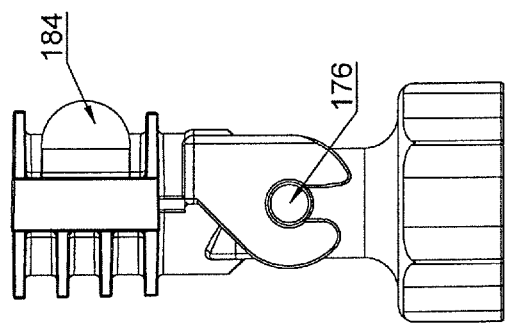
FIG. 30 is a side view of the clamp fitting.
Figure 29:
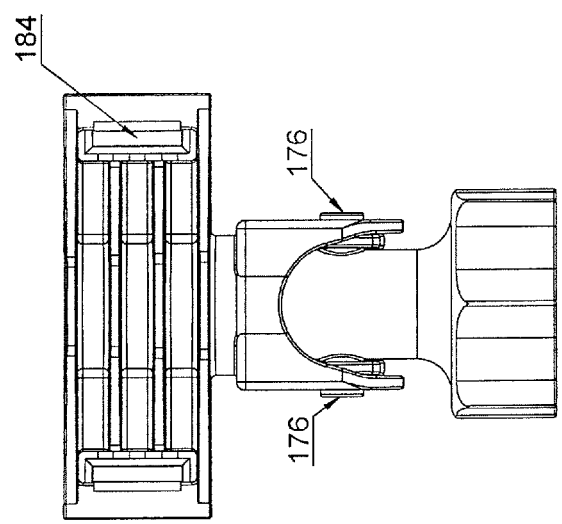
FIG. 29 is a bottom view of the pinch fitting, illustrating the interlocking cooperation of the spring tabs and the lower portion of the clamp.
Figure 31:
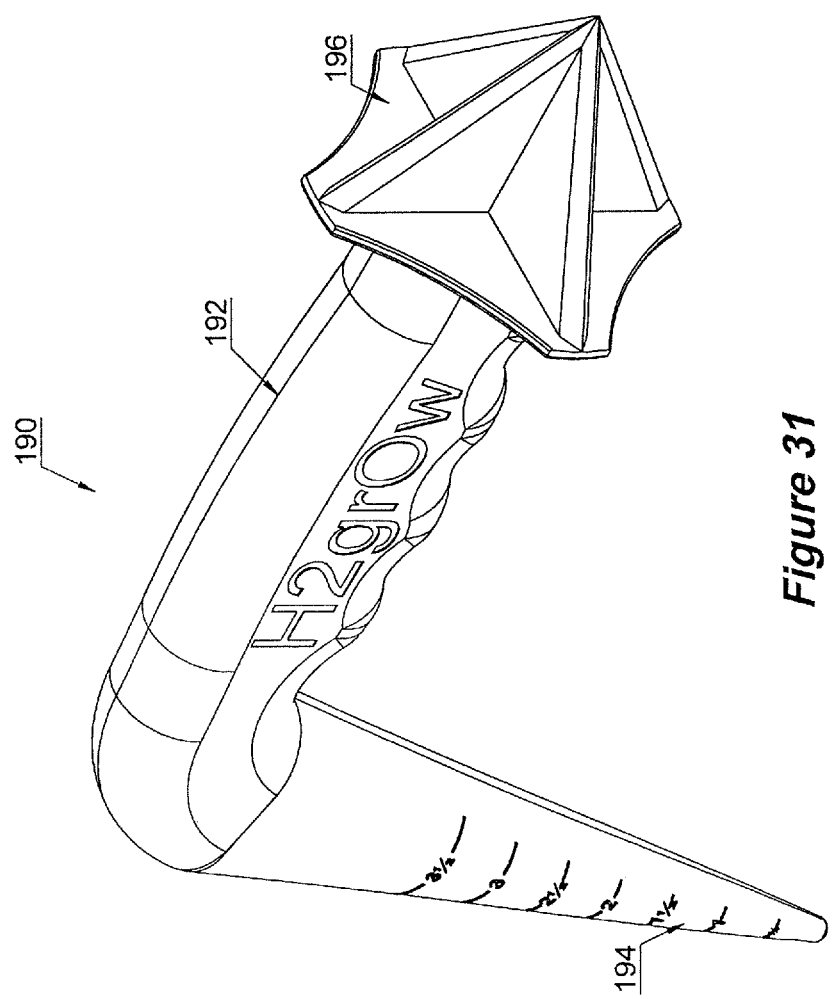
FIG. 31 is a perspective view of the combination dibber bag piercing tool of the instant invention.
Figure 33:
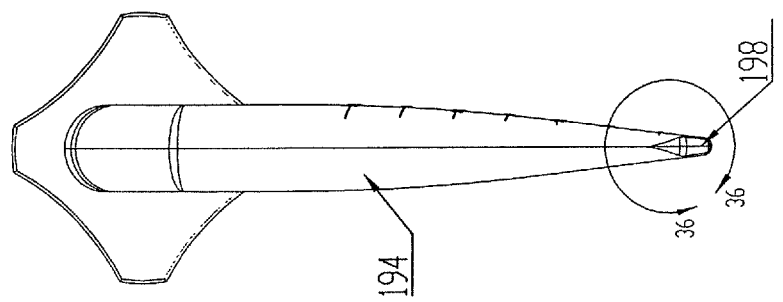
FIG. 33 is a rear view of the combination dibber bag piercing tool.
Figure 32:
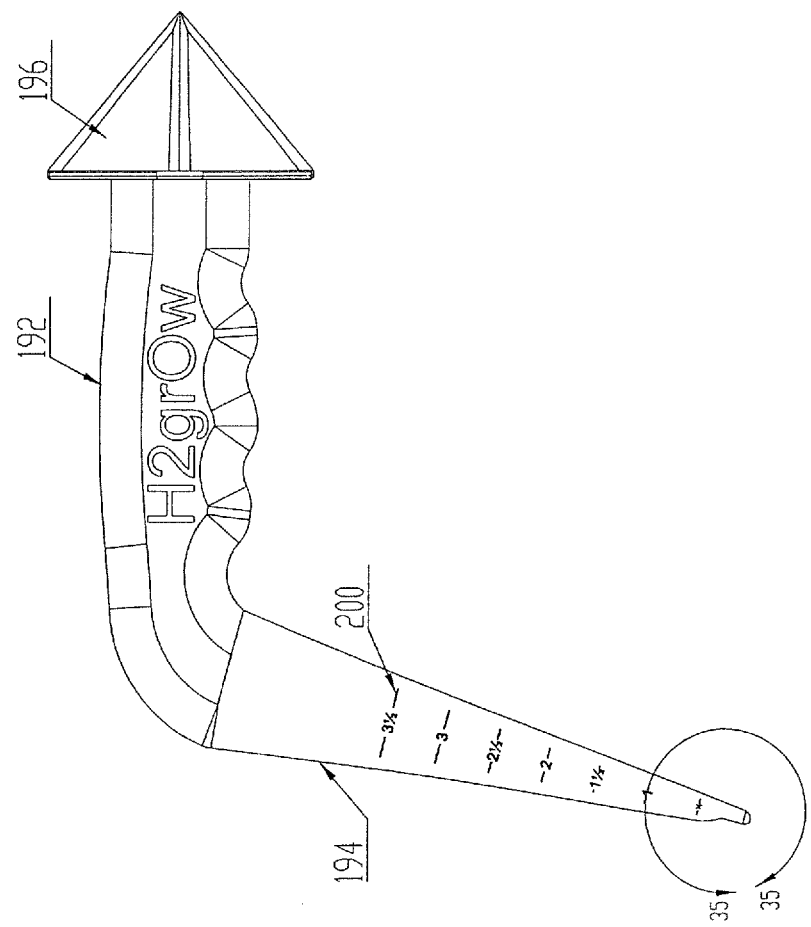
FIG. 32 is a side view of the combination dibber bag piercing tool.
Figure 34:
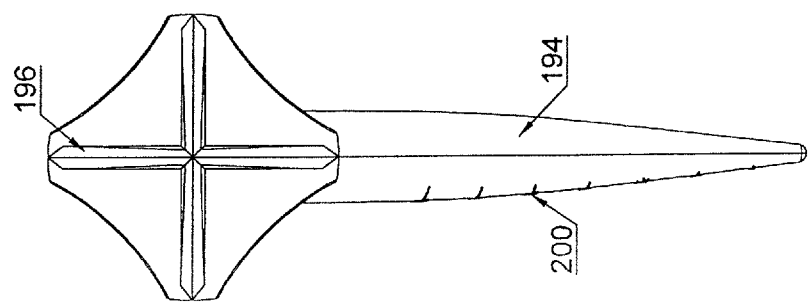
FIG. 34 is a front view of the combination dibber bag piercing tool.
Figure 35:
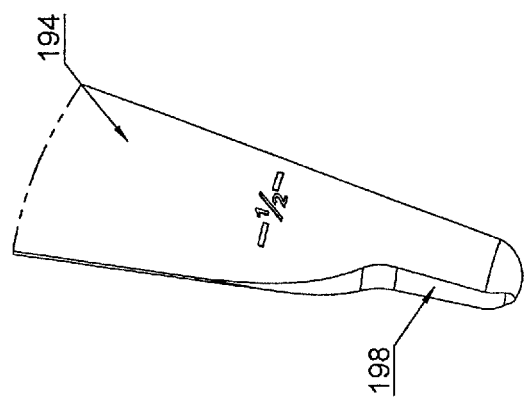
FIG. 35 is a partial enlarged view taken along lines 35-35 of FIG. 32.
Figure 36:
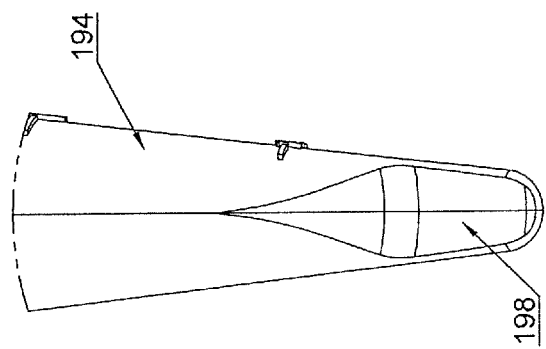
FIG. 36 is a partial enlarged view taken along lines 36-36 of FIG. 33.

Referring to FIG. 24-30, the clamp fittings 162 are illustrated. The clamp fittings include a first end 164 constructed and arranged to cooperate with a water supply, and a second end 166 constructed and arranged to include a clamping assembly 168 for sealing cooperation with said first end 202 of the irrigation tube 26. The first end 164, thus, preferably includes threads sized for attachment to a conventional water hose 182 (FIG. 20) or hose bib 206 (FIG. 9). The clamp assembly 168 generally includes a hollow or tubular stem 170 and a pair of pivoting members 172. The tubular stem is sized for insertion into an inner bore of the irrigation tube 26 and may include one or more circular ribs 174 constructed and arranged to create a sealing ring within the irrigation tube as illustrated in FIG. 28. The tubular stem 170 is positioned between the pivoting members and includes a pair of pivot pins 176 about which the pivoting members 172 are pivotable between a first position (FIGS. 24, 25) and a second position (FIGS. 26-30). The first position allows insertion of the tubular stem 170 into the inner bore 210 (FIG. 23) of the irrigation tube 26. The second position creating a seal between the irrigation tube and the pair of pivoting members (FIG. 28). In at least one embodiment, each pivoting member 172 includes a semi-cylinder shaped cavity 178 wherein the semi cylinder is sized to cooperate with the irrigation tube and the tubular stem. Positioned within the semi cylindrical cavity 178 is at least one inwardly extending semi ring 180 positioned adjacent to at least one circular rib 174 when said pivoting members are in said second position. In this manner, the wall of the irrigation tube is bent inward and outward through a tortuous path to create a plurality of sealing areas to prevent leakage of pressurized water from the irrigation tube during usage. See FIG. 28. Spring clips 184, fasteners or the like may be utilized to retain the pivoting members 172 in their second position.

Figure 7:
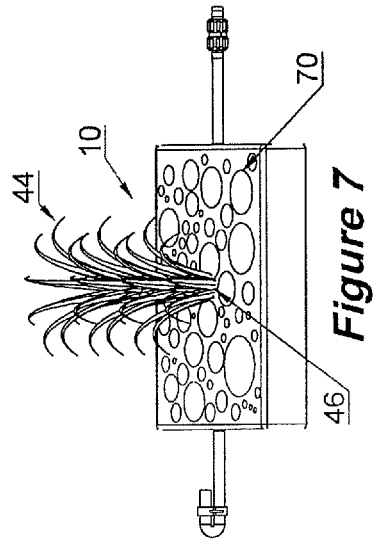
FIG. 7 illustrates the grow bag with a dosing irrigation tube of the instant invention containing a plant species.

The design of the grow bag with a dosing irrigation tube 26 provides for an easy to use gardening device. The design allows a user the ability to grow a variety of plants and vegetables, even where space is limited. Placed within the inner cavity 24 of the grow bag with a dosing irrigation tube 26 is plant growth material 42 (FIG. 6). Plant growth material 42 can be any material that supports and provides growth of plant life, including soil, sterile soil which has been treated, i.e. heat or chemical, to eliminate weed growth and organisms that cause disease, mulch, stone, peat moss, soil-less mixtures of peat and vermiculite, composted materials, or the like. Additionally, the proper percentage of raw materials used will provide optimum soil structure for root development. The plant growth material 42 may also include materials that provide for growing and sustaining plant growth, including fertilizer, soil and pH modifiers, soil and pH balancers, or the like. One of the advantages, therefore, of the instant invention is that the grow bag with a dosing irrigation tube 26 can be used to provide an individual containment device for which plant growth may be inserted within and allowed to grow. FIG. 7 illustrates the grow bag with a dosing irrigation tube 26 containing a plant species planted therein through an aperture 46 located on the top panel 12. The grow bag with a dosing irrigation tube 26 may be constructed of different sizes and shapes to accommodate the growth of one or more plant species and should be sized to provide the appropriate amount of root growth. For example, the grow bag may be designed to contain adequate space for optimal root growth. While the size of the bag may vary according to the amount and type of plant to be grown, preferable dimensions of the grow bag with a dosing irrigation tube 26 include the following range, from 30 inches by 18 inches by 10 inches to 18 inches by 10 inches by 8 inches. Additionally, the bags may be sized to hold a desired amount of plant material, such as a range of from 0.5 cubic feet (15 quarts) to 2 cubic feet (60 quarts). It should be noted that smaller or larger sizes may be utilized without departing from the scope of the invention.

In use, the consumer obtains the grow bag with a dosing irrigation tube 26 and places it at the desired location. An aperture 46 located on the top panel 12 may be used to place one or more plant species within the inner cavity 24, see FIG. 6, of the grow bag with a dosing irrigation tube 26. Once inserted, the plant species rests within and is supported by the plant growth material 42. The aperture 46 may contain a covering which prevents the outside environment, i.e. the atmospheric air or water, from contacting the sterile environment. The aperture 46 may be removable from the top surface or the covering may be made of a punctureable material such that piercing the covering with a sharp object provides an opening for which the plant species roots may be inserted. Alternatively, the top panel 12 may simply be cut by a sharp object, thereby forming the opening or slit. The grow bag with a dosing irrigation tube 10 contains plant growth material 42 which is particularly suited to the specific plant species that the user desires to grow.

By providing a species specific grow bag, the user is able to grow a variety of plant species that might not otherwise grow and flourish if the plants were to be planted directly into the native soil. In order to provide water, the user attaches the hose connector 36 to a water supply, such as a water faucet. To prevent water from escaping from the first end 28, the irrigation tube 26 can be sealed by the use of a hose clip 34. Once the water supply is turned on, water enters the inner cavity 24 of the grow bag with a dosing irrigation tube 26 through the one or more nutrient dispensing apertures, or slits 40 positioned within the middle portion 32. Flow of water can be controlled by varying the amount and/or size of the apertures, the spacing of the apertures, the diameter of the irrigation tube 26, by use of a timer 186, flow control valve 188 (FIGS. 17-19), or by any other means known to one of skill in the art.

Figure 8:
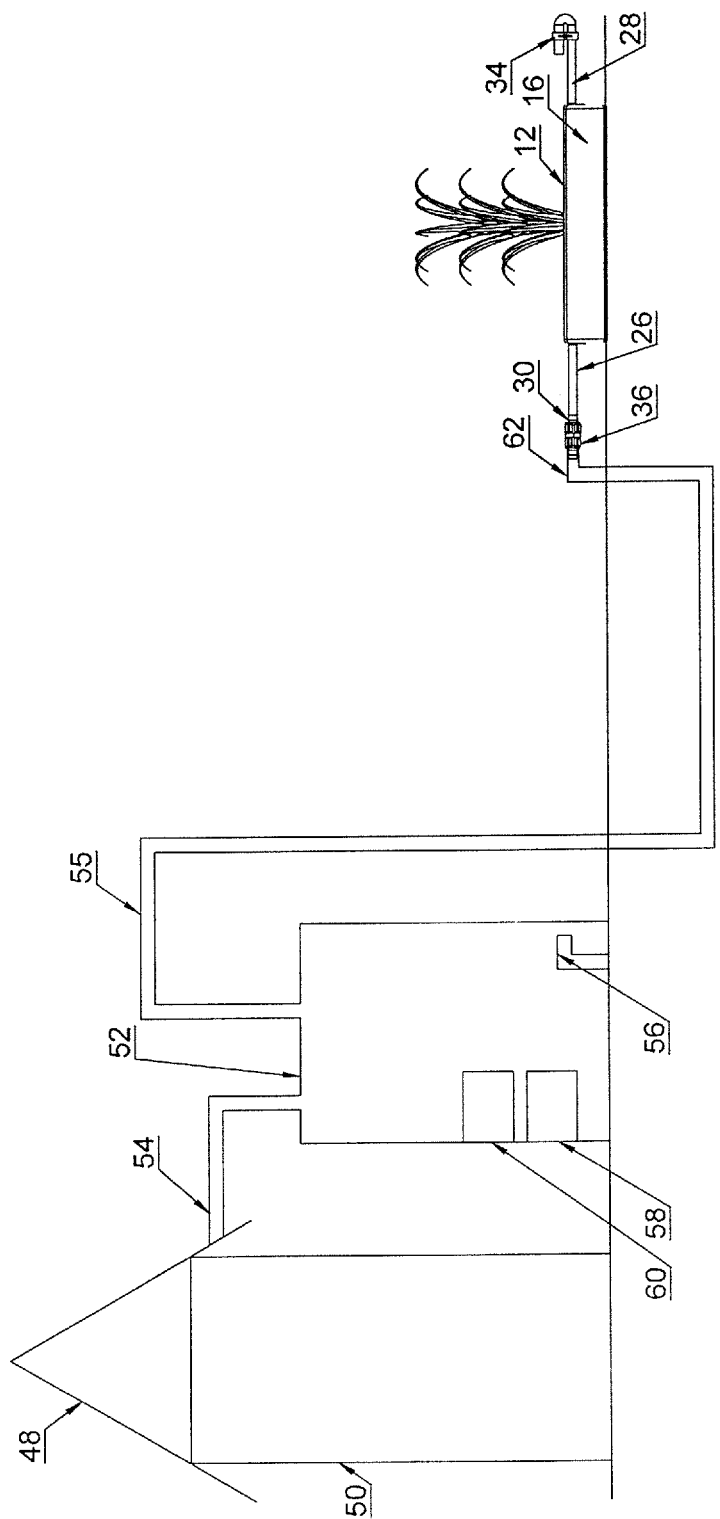
FIG. 8 is a schematic illustration depicting the grow bag with a dosing irrigation tube of the instant invention attached to a rain catching watering system.

In addition to attachment to a water faucet, the grow bag with a dosing irrigation tube 26 may be attachable to a self-sustaining, environmentally friendly, green irrigation system. FIG. 8 is a schematic illustration of such a system in which the grow bag with a dosing irrigation tube 26 is shown attached to a rain catching system. Rainwater runoff from the roof 48 of a structure 50 is collected into a holding tank 52 through pipe 54. Water exits the holding tank 52 through water delivery pipe 55 through by mechanical mechanism, such as through the use of a pump 56. The pump 56 is coupled to a power system, such as a solar panel 58 or 12 volt system which can be controlled by a control panel 60. The grow bag with a dosing irrigation tube 26 is coupled to the water delivery pipe 55 which provides water to the plants in a controllable manner. Water is provided to the grow bag 10 with a dosing irrigation tube through connection of the second end 30 of the dosing irrigation tube 26 with the dispersing end 62 of the delivery pipe 55. As water is pumped through the system, it moves through the dosing irrigation tube and is dispensed at the desired location within the inner cavity of the grow bag.

Figure 19:
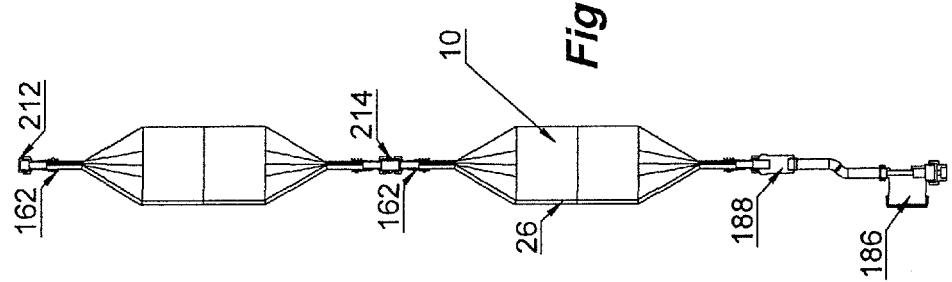
FIG. 19 is a section view taken along lines 19-19 of FIG. 18.
Figure 20:
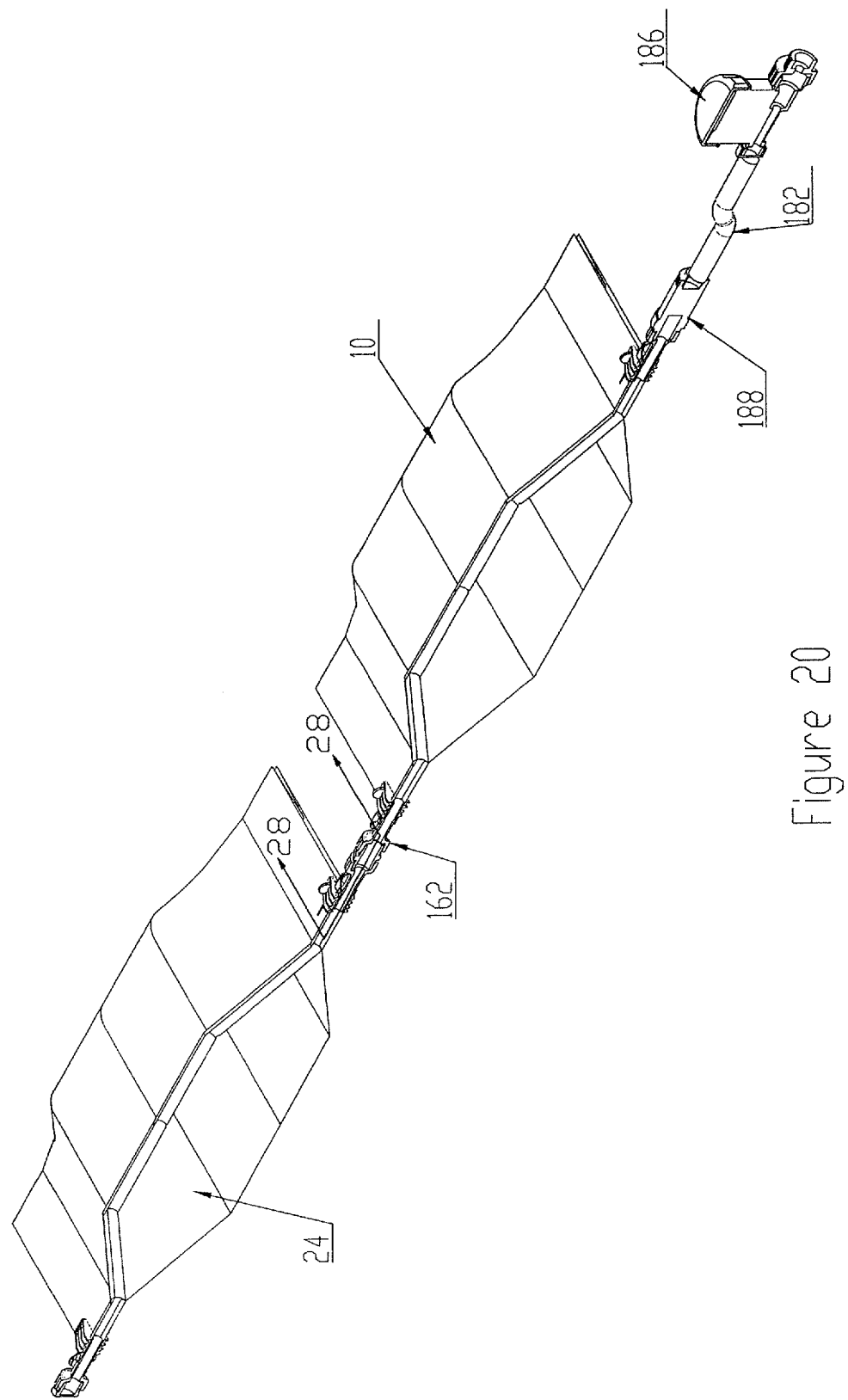
FIG. 20 is a perspective section view taken along lines 19-19 of FIG. 18.

One of the advantages of the instant invention is that a plurality of individual grow bags with a dosing irrigation tube 26 can be interconnected to form a system of plant growth containment devices. The system can be constructed of two or more grow bags 10 coupled in a linear or non-linear vertical and/or horizontal arrangement. FIGS. 9 and 17-20, illustrate an interconnection of a plurality of grow bags with a dosing irrigation tube 26 in a linear arrangement. The distal end of the irrigation tube 26 associated with the distally positioned grow bag is not attached to a grow bag, thereby allowing the irrigation tube to be sealed by use of the hose clip 34$a$ or plug 212 (FIG. 19). The second end 30$a$ of the irrigation tube 26$a$ associated with the grow bag with a dosing irrigation tube 26$a$ can be coupled to the first end 28$b$ of the irrigation tube 26$b$ associated with the grow bag with a dosing irrigation tube 26$b$ through connecting element 64, such as a male/female threaded connector 214 constructed to receive a corresponding male/female head attached to 30$a$ and 28$b$. The second end 30$b$ of the grow bag with a dosing irrigation tube 26$b$ is coupled to the first end 28$c$ of the irrigation tube 26$c$ associated with the grow bag with a dosing irrigation tube 26$c$. The second end 30$c$ of the irrigation tube 26$c$ associated with the grow bag with a dosing irrigation tube 26$c$ can be attached to a water supply through a water dispensing device 66. The advantage of utilizing such a system is that a variety of plants, which may require different growing materials, can be placed together in an easy to use and maintain system. The user can attach an unlimited number of grow bags and arrange each of the grow bags in an unlimited number of design configurations. Moreover, since each of the numerous grow bags with a dosing irrigation tube 26 are coupled together by a single water source, the entire system can be properly watered without the need of the user to water each of the numerous bags individually.

To aid in the aesthetic appearance, the top surface, bottom surface, the side walls, or combinations thereof, of the grow bags with a dosing irrigation tube 26 may contain an imprinted aesthetic covering, including decorative indicia, such as words, symbols, or graphics. FIG. 7 is a top view of the grow bag, illustrating the decorative covering 68 printed onto the top surface 12. As illustrated, the decorative covering 68 is in the form of graphics depicting stones 70. The decorative covering may also be included on the bottom panel 14 and may include wording, including use instructions and bag contents. The decorative coverings imprinted on the surfaces can be accomplished using techniques known to one of skill, including, but not limited to, laser etching techniques or silk screening techniques.

FIGS. 11-16 illustrate an alternative embodiment of the grow bag with a dosing irrigation tube 126. As illustrated in FIG. 11, the grow bag with a dosing irrigation tube 26 comprises a top surface 112 and a bottom surface 114. The top surface 112 and the bottom surface 114 are secured to side walls 116, 118, 120 and 122 to form an inner cavity 124. While the illustrative embodiment is generally parallelepiped shaped, the instant invention is not limited to a body having such shape. Attached to the grow bag is an irrigation tube 126. The irrigation tube 126 is constructed to traverse the length of the grow bag and contains a first end 128, a second end 130, and a middle portion 132. Attached to the first end 128 is a hose clip 134. Attached to the second end is a hose connector 136. The irrigation tube 126 is inserted within the grow bag with a dosing irrigation tube 126 through an opening 138 of the side wall 120 and an opening positioned on the side wall 122, not illustrated. The middle portion 132 of the irrigation tube 126 is secured to the bottom portion of the top surface 12 through various securing means known to one of skill in the art, including attachment through chemical bonding or stitching, and includes a manifold having multiple nutrient delivering elements 132$a$, 132$b$ and 132$c$ distributed along the bottom portion of the top surface 12 to evenly deliver plant nutrients, such as water, to various areas within the grow bag with a dosing irrigation tube 126. Alternatively, the upper surface 112 could be constructed of a multi-ply layering such that the middle portion 132 can be secured through insertion between the layers. Positioned along the length of the middle portion 132 of the irrigation tube 126 is one or a plurality of variously sized nutrient dispensing apertures, or slits 140.

Figure 16:
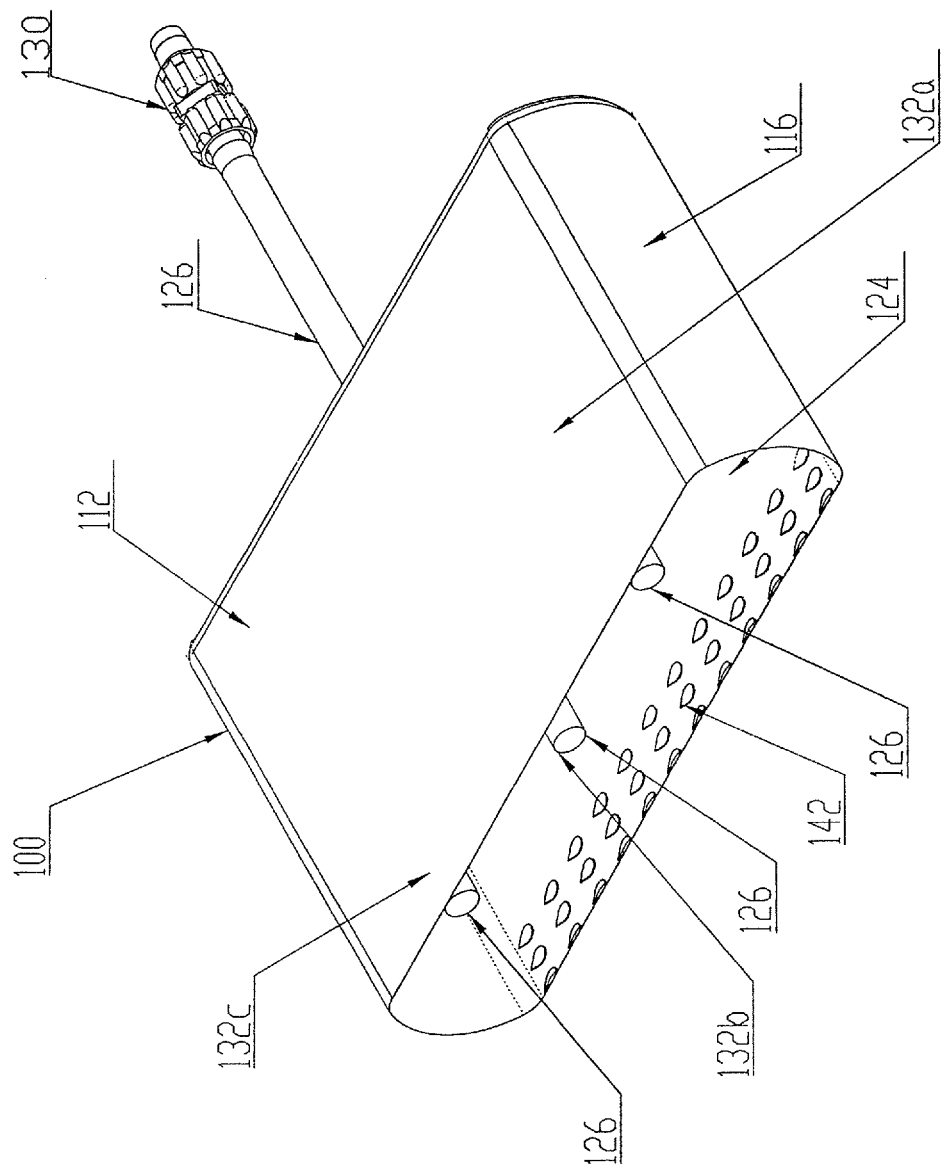
FIG. 16 is a partial perspective cross sectional view of the alternative embodiment of the grow bag with a dosing irrigation tube taken along lines 16-16 of FIG. 15, illustrating the inner cavity.
Figure 17:
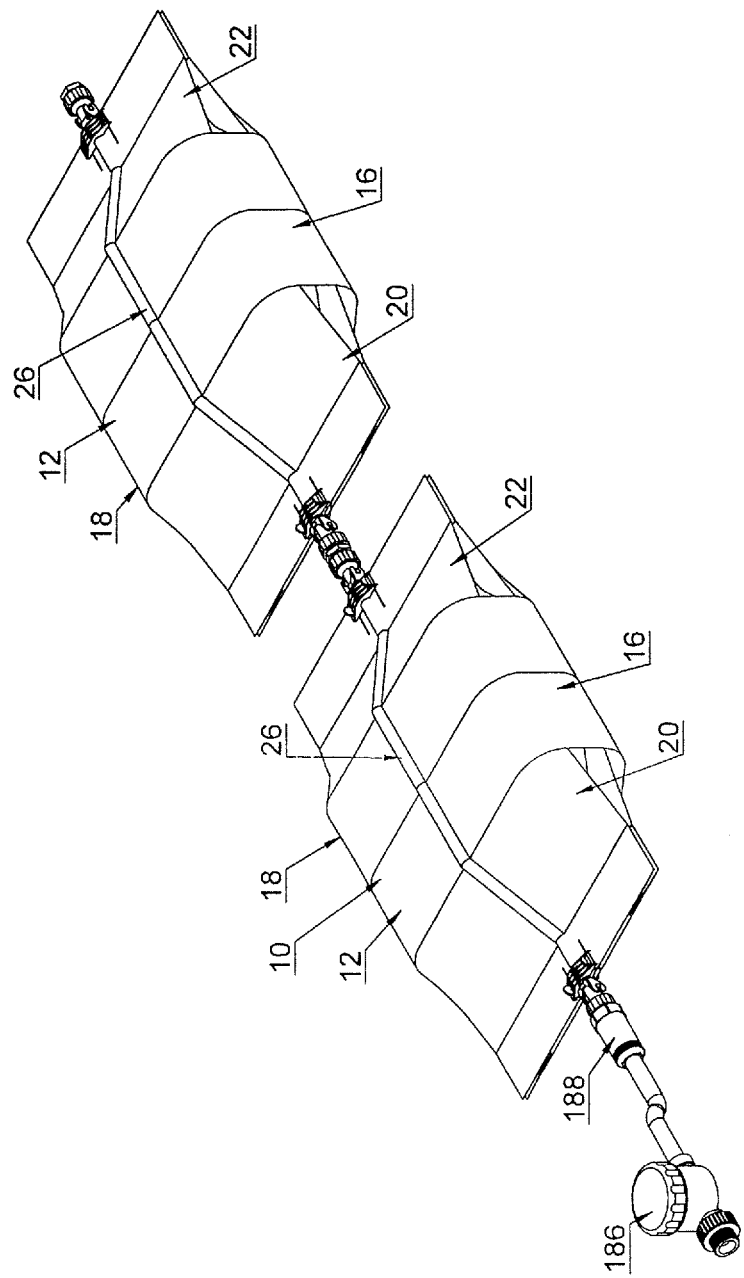
FIG. 17 is a perspective view of one embodiment of the grow bag system of the instant invention.
Figure 18:
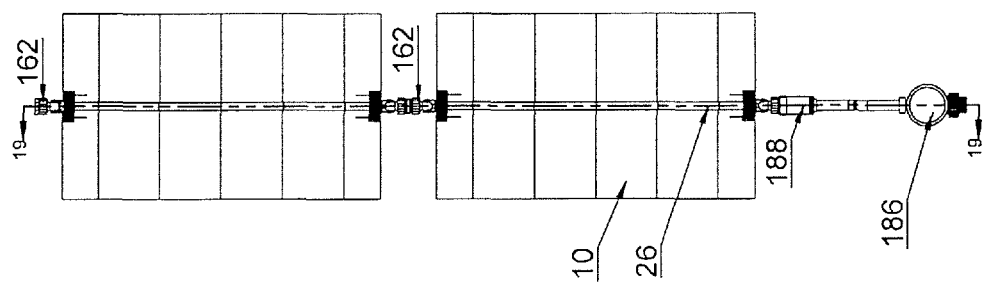
FIG. 18 is a top view of the embodiment illustrated in FIG. 17.

Placed within the inner cavity 124, see FIG. 16, of grow bag with a dosing irrigation tube 126 is plant growth material 142. The plant growth material can be any material that supports and provides growth of plant life, including soil, sterile soil which has been treated, i.e. heat or chemical, to eliminate weed growth and organisms that cause disease, mulch, stone, peat moss, soil-less mixtures of peat and vermiculite, or the like. The plant growth material 142 may also include materials that provide for growing and sustaining plant growth, including fertilizer, soil and pH modifiers, soil and pH balancers, or the like. The grow bag with a dosing irrigation tube 126 may be constructed of different sizes and shapes to accommodate the growth of one or more plant species. The bag is preferably sized to provide the appropriate amount of space for root growth. For example, the size of the bag could be designed to have the following range of dimensions, from 30 inches by 18 inches by 10 inches to 18 inches by 10 inches by 8 inches. Alternatively, the grow bag with a dosing irrigation tube 126 could be constructed to hold a certain amount of material, for example plant growth material in the range of 0.5 cubic feet (15 quarts) to 2 cubic feet (60 quarts).

Referring to FIGS. 31-36, a dibber tool 190 is illustrated for piercing the grow bag 10 and for placing the propagative portion of a plant within the growth medium. The dibber tool generally includes a handle portion 192, a dibber portion 194 and a piercing portion 196, wherein the dibber portion is positioned at a first end of the dibber tool and the piercing portion is positioned at a second end of the dibber tool with the handle portion being positioned in a central portion of said dibber tool. The piercing portion 196 of the dibber tool 190 is constructed and arranged to pierce the top panel 12 of the grow bag 10 in a predetermined pattern. In a most preferred embodiment, the dibber tool pierces a cross pattern which allows the opening in the grow bag to expand as needed with respect to plant growth, allowing a portion of the plant to grow through the piercing outside of said bag while restricting insects and the like from entering the grow bag. The dibbing portion preferably includes a cup 198 sized to at least partially contain a propagative portion of a plant such as a seed, bulb tuber or the like. The dibber portion 194 may also be provided with indicia 200 for indicating to the user the depth in which the propagative potion of the plant is being placed within the growth medium. The indicia may include numbers, letters, symbols, colors or suitable combinations thereof. The dibber tool is preferably constructed from a material such as plastic, however, metals, rubbers, phenolics or suitable combinations thereof may be utilized without departing from the scope of the invention.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A grow bag system comprising:
a grow bag, said grow bag sized and shaped to contain a growth medium for plants, said grow bag having a multi-ply layering top panel for enclosing a top surface of said growth medium, said top panel including a bottom surface, an irrigation tube secured through insertion between layers of the multi-ply layering top panel, said irrigation tube secured to said bottom surface and extending between said top panel and said growth medium, said irrigation tube including a first end, a second end and a middle portion, said first end of said irrigation tube constructed and arranged for connection to a water supply, said middle portion of said irrigation tube sized for transferring water at a predetermined rate, said middle portion including at least one aperture for transferring said water to said growth medium at a second predetermined rate, said second end constructed and arranged to include a plug member to prevent said water from traversing through said second end;
whereby said grow bag is a self-contained unit suitable for accepting a propagative portion of a plant within said growth medium for growth of a portion of said plant within said grow bag and a portion of said plant outside of said grow bag;
characterized in that the middle portion of the irrigation tube is secured to the bottom surface of the top panel.

2. The grow bag system of claim further including an irrigation timer, said irrigation timer constructed and arranged to control flow of said water in a timed manner to said irrigation tube.

3. The grow bag system of claim 1 further including a pressure regulator for regulating pressure of said water entering said irrigation tube.

4. The grow bag system of claim 1 wherein said second end of said irrigation tube includes a second fitting, said second fitting constructed and arranged for connection to a first fitting of an adjacent second grow bag, whereby a portion of the water flowing through said first grow bag irrigation tube flows into the irrigation tube of said second grow bag.

5. The grow bag system of claim 1 wherein said irrigation tube is formed from a portion of said top panel.

6. The grow bag system of claim 5 wherein said top panel includes a lap joint whereby a first portion of said top panel extends over a top surface of a second portion of said top panel, said lap joint including a pair of weldments with a space therebetween, said pair of weldments extending substantially the length of said top panel to define said irrigation tube.

7. The grow bag system of claim 6 wherein said pair of weldments are formed by heat.

8. The grow bag of claim 6 wherein said space between said pair of weldments includes a release agent to prevent weldment of said space.

9. The grow bag system of claim 6 wherein said weldments are formed by friction.

10. The grow bag system of claim 9 wherein said space between said pair of weldments includes a release agent to prevent weldment of said space.

11. The grow bag system of claim 6 wherein said weldments are formed by adhesive.

12. The grow bag system of claim 11 wherein said space between said pair of weldments includes a release agent to prevent weldment of said space.

13. The grow bag system of claim 6 wherein said grow bag includes a bottom panel, a pair of side panels and a pair of end panels, said panels permanently affixed to each other to define said grow bag.

14. The grow bag system of claim 13 wherein said panels are constructed from a polymeric material, said polymeric material being substantially impermeable to both air and water.

15. The grow bag system of claim 13 wherein said panels are constructed from a polymeric material, said polymeric material being at least partially permeable to air and substantially impermeable to water.

16. The grow bag system of claim wherein said panels are constructed from said polymeric material, said polymeric material being at least slightly permeable to air and at least partially permeable to water.

* * * * *